US008525279B2

(12) United States Patent
Gowrishetty et al.

(10) Patent No.: US 8,525,279 B2
(45) Date of Patent: Sep. 3, 2013

(54) SINGLE ELEMENT THREE TERMINAL PIEZORESISTIVE PRESSURE SENSOR

(75) Inventors: Usha R. Gowrishetty, Louisville, KY (US); Kevin M. Walsh, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 613 days.

(21) Appl. No.: 12/794,288

(22) Filed: Jun. 4, 2010

(65) Prior Publication Data
US 2010/0308791 A1 Dec. 9, 2010

Related U.S. Application Data

(60) Provisional application No. 61/184,200, filed on Jun. 4, 2009.

(51) Int. Cl.
*G01R 29/22* (2006.01)
*H01L 21/302* (2006.01)

(52) U.S. Cl.
USPC ...... 257/419; 257/E21.214; 438/5; 324/76.49

(58) Field of Classification Search
USPC .................. 257/417; 324/76.29, 76.49
See application file for complete search history.

(56) References Cited

U.S. PATENT DOCUMENTS

| | | |
|---|---|---|
| 4,317,126 A | 2/1982 | Gragg, Jr. |
| 4,651,120 A | 3/1987 | Aagard |
| 4,889,590 A | 12/1989 | Tucker et al. |
| 5,050,423 A | 9/1991 | Czarnocki |
| 5,317,923 A | 6/1994 | Erichsen et al. |
| 5,432,372 A | 7/1995 | Ohtani |
| 6,079,277 A | 6/2000 | Chung |
| 6,584,660 B1 | 7/2003 | Shimogawa et al. |
| 6,838,303 B2 | 1/2005 | Wang et al. |
| 7,007,553 B2 | 3/2006 | Kinoshita et al. |
| 7,073,375 B2 | 7/2006 | Parker et al. |
| 7,077,008 B2 | 7/2006 | Pham et al. |
| 7,167,009 B2 | 1/2007 | van Schoor et al. |
| 7,401,525 B2 | 7/2008 | Cobianu et al. |
| 2005/0038481 A1 | 2/2005 | Chinchoy et al. |

OTHER PUBLICATIONS

Gowrishetty, et al., "Development of Ultra-Miniature Pressure Sensors for 1-French Biomedical Applications and Beyond," Sensor Lett. 2008, vol. 6, No. 3, pp. 433-440.

(Continued)

*Primary Examiner* — Jarrett Stark
*Assistant Examiner* — Lawrence Tynes, Jr.
(74) *Attorney, Agent, or Firm* — Wood, Herron & Evans, LLP

(57) ABSTRACT

Embodiments of the invention provide for three-terminal pressure sensors ("3-TPS"), a method of measuring a pressure with a 3-TPS, and a method of manufacturing a 3-TPS. In some embodiments, the 3-TPS includes a semiconducting layer with cavity and a 3-TPS element having at least one piezoresistive layer overlapping at least a portion of the cavity and oriented at an angle selected to provide a desired sensitivity for the 3-TPS. The method of measuring a pressure with a 3-TPS is performed with a 3-TPS that includes an input terminal, first and second output terminals, and a 3-TPS element, the 3-TPS element overlapping at least a portion of a cavity at a predetermined angle. The method comprises providing an input signal to the input terminal of the 3-TPS, determining a difference between two output signals from the respective output terminals of the 3-TPS, and correlating the determined difference to a pressure.

23 Claims, 7 Drawing Sheets

(56) References Cited

OTHER PUBLICATIONS

Gragg, et al., "Compensation and Calibration of a Monolithic Four Terminal Silicon Pressure Transducer," Tech. Dig. IEEE Solid-State Sensor Conference, 1984, pp. 21-27.

Bao, et al., "Geometric Design Rules of Four-Terminal Gauge for Pressure Sensors," Sensors and Actuators, 18, 1989, pp. 149-156.

Gridchin and Gridchin, "A Three-Terminal Silicon Piezotransducer: General Consideration and Estimation of Sensitivity," Electron Devices and Materials, 4th Annual Siberian Russian Workshop, 2003, pp. 58-63.

Gowrishetty, et al., "Single Element 3-Terminal Pressure Sensors: A New Approach to Pressure Sensing and its Comparison to the Half Bridge Sensors," Transducers, Jun. 2009, pp. 1134-1137.

Sze, Semiconductor Sensors, New York: Wiley, 1994, Print, pp. 214-217, 238-245.

Nathan and Allegretto, "Geometric Factor for Hall Mobility Characterization Using the van der Pauw Dual Configuration," IEEE Trans. Electron Devices, vol. 40, No. 8, Aug. 1993, pp. 1508-1511.

Chiou and Chen, "Thermal Hysteresis Analysis of MEMS Pressure Sensors," Sensors and Actuators A, vol. 135, 2007, pp. 107-112.

Ho, "The Design and Fabrication of a Micro-Thermal/Pressure Sensor for Medical Electro-Skin Application," Solid-State Electronics, vol. 46, 2002, pp. 1205-1209.

Burais, et al., "Physical and Geometric Singularities Modelling Techniques for Electrostatic and Electromagnetism Problems," IEEE Transactions on Magnetics, vol. 21, No. 6, Nov. 1985, pp. 2157-2160.

Ghandhi, VLSI Fabrication Principles: Silicon and Gallium Arsenide, New York: Wiley, 1994, Print, pp. 449-451.

Murarka, et al., "Investigation of the Ti-Pt Diffusion Barrier for Gold Beam Leads on Aluminum," J. Electrochemical Soc., vol. 125, No. 1, 1978, pp. 156-162.

Humpston and Jacobson, Principles of Soldering, Materials Park, Ohio: ASM International, 2004, Print, pp. 147-148.

Kovacs, Micromachined Transducers Sourcebook, Boston, MA, WCB, 1998, Print, p. 69.

Harsanyi, Sensors in Biomedical Applications: Fundamentals, Technology & Applications, Lancaster, PA, Technomic Pub. 2000, Print, pp. 112-116.

Bao, Analysis and Design Principles of MEMS Devices, Amsterdam, Elsevier, 2005, print, pp. 282-293.

Gowrishetty, "Ultra-Miniature Pressure Sensors Leading to a Novel 3-Terminal Single Element Design," PhD Dissertation, Dec. 2008, Department of Electrical and Computer Engineering, University of Louisville, Louisville, Kentucky.

Gowrishetty, et al., "Development of Ultra-Miniature 3-Terminal Single Element Piezoresistive Pressure Transducers for Application in 1-French Catheters," Poster Presentation on Jun. 4, 2008 at Hilton Head Workshop 2008: A Solid-State Sensors, Actuators and Microsystems Workshop.

US 8,525,279 B2

SINGLE ELEMENT THREE TERMINAL PIEZORESISTIVE PRESSURE SENSOR

CROSS REFERENCE TO RELATED APPLICATION

This application claims priority to U.S. Patent Application Ser. No. 61/184,200 to Usha R. Gowrishetty et al. entitled "SINGLE ELEMENT THREE TERMINAL PIEZORESISTIVE PRESSURE SENSOR" and filed on Jun. 4, 2009, which application is incorporated by reference herein.

GOVERNMENT RIGHTS

The invention was supported in whole or in part by Grant No. EPS0447479 from the National Science Foundation. The Government may have certain rights in the invention.

FIELD OF THE INVENTION

The present invention relates pressure sensors, and in particular a pressure sensor that includes at least one piezoresistive material.

BACKGROUND OF THE INVENTION

A pressure sensor is typically a device with a diaphragm which, when exposed to a pressure, deflects and causes that pressure sensor to output a signal associated with that pressure. Conventional pressure sensors may be used in a variety of applications, including pressure monitoring of a person's vitals. Conventional pressure monitoring may include intracranial pressure monitoring during neurosurgery, air pressure monitoring for respiratory diseases, blood pressure monitoring during surgery and/or intensive care, intra-uterine monitoring for obstetrics, as well as abdominal and/or urinary pressure monitoring for the diagnosis of various disorders. Typically, these measurements are made through noninvasive techniques or invasive techniques, such as through a catheter.

Catheters may include a pressure sensor that may be in turn configured extravascularly or intravascularly. When pressure sensors are configured intravascularly, they may be further configured at the tip of the catheter or on the side wall of the catheter. Side-wall pressure sensors typically have an advantage in measuring pressure in that the side-wall pressure sensor is often able to more accurately measure the normal pressure against the side-wall of the catheter as well as the momentum of the fluid as it moves around the catheter. However, conventional pressure sensors are often too large to be configured either as catheter-tipped pressure sensors or as side-wall pressure sensors.

Conventional catheters are often configured with their diameters corresponding to French units, where 1 French is equivalent to about ⅓ of a millimeter (e.g., 333 microns or 333 μm). As such, pressure sensors configured thereupon must be somewhat smaller. Conventional pressure sensors are often configured to utilize four terminals and may include a half-Wheatstone bridge design or a full-Wheatstone bridge design. However, since many catheters (e.g., including those that are 1 French or smaller) can only accommodate three lead wires (e.g., the smaller the catheter the less the number of lead wires that may be configured therein), conventional pressure sensors are generally unable to be fully configured to sense pressure associated therewith. Moreover, conventional pressure sensors often include two or more piezoresistors in various orientations, increasing fabrication costs (e.g., the time to fabricate, as well as the cost from the increased likelihood of lithographic alignment errors), the likelihood of components failing and/or otherwise increasing the overall size of conventional sensors.

Therefore, a need exists in the art for a pressure sensor that overcomes the aforementioned limitations in conventional designs.

SUMMARY OF THE INVENTION

Embodiments of the invention address these and other problems associated with the prior art by providing a three-terminal pressure sensor ("3-TPS"), a method of measuring a pressure with a 3-TPS, and a method of manufacturing a 3-TPS. Specifically, the 3-TPS comprises a 3-TPS element that at least partially overlaps a cavity. The pressure in the cavity can be measured utilizing the 3-TPS element. In particular, an input current is provided to an input terminal electrically coupled to the 3-TPS element. Two output currents at two output terminals electrically coupled to the 3-TPS element are then measured and their difference is calculated. In some embodiments, the difference of the currents with respect to pressure varies in a substantially linear manner. Thus, when the difference of the currents is determined, the corresponding pressure experienced by the 3-TPS element, and thus the 3-TPS itself, may be determined. In specific embodiments, the 3-TPS element itself may be about 40 μm long and about 20 μm wide, with a gap in the two output terminals being about 3 μm wide. In further specific embodiments, at least a portion of the 3-TPS element is configured across the perimeter of the diaphragm, and in still further specific embodiments at about a 45° angle from the tangent of a line at the perimeter of the diaphragm or at about 45° angle to the <110> direction on a (100) n-type wafer.

In some embodiments, a 3-TPS consistent with embodiments of the invention includes a first semiconducting layer having a substantially circular cavity, an insulating layer configured on the semiconducting layer, at least a portion of the insulating layer overlapping the cavity, and a second semiconducting layer configured on the insulating layer. The 3-TPS further includes a 3-TPS element, at least a portion of which is configured on the second semiconducting layer. The 3-TPS element, in turn, includes at least one piezoresistive layer having a length of at least about 40 μm and a width of at least about 20 μm, an input terminal, as well as first and second output terminals. Specifically, the 3-TPS element overlaps at least a portion of the perimeter of the cavity and is oriented at an angle of about 45 degrees from a tangent line to the perimeter of the cavity. Furthermore, at least a portion of the first or second output terminals overlaps the cavity and at least a portion of the input terminal does not overlap the cavity.

In alternative embodiments, a method of measuring a pressure with a 3-TPS of the type that includes an input terminal, first and second output terminals, and a 3-TPS element is provided. In those embodiments, the 3-TPS element overlaps at least a portion of a cavity at a predetermined angle. The method thus comprises providing an input signal to the input terminal of the 3-TPS, determining a difference between two output signals from the respective output terminals of the 3-TPS, and correlating the determined difference to a pressure.

In additional embodiments, a method of manufacturing a 3-TPS is provided. The method includes fabricating a 3-TPS element that overlaps at least a portion of a cavity, the 3-TPS element having an angle at which the 3-TPS element is configured across the at least a portion of the cavity and fabricating an input terminal and first and second output terminals in communication with the 3-TPS element.

In further embodiments, a 3-TPS is provided, the 3-TPS including a semiconducting layer having a cavity and a 3-TPS element having at least one piezoresistive layer overlapping at least a portion of the cavity and oriented at an angle selected to provide a desired sensitivity for the 3-TPS.

In still further embodiments, a method is provided that comprises fabricating a three terminal pressure sensors ("3-TPS") of the type that includes a 3-TPS element having at least one piezoresistive layer overlapping at least a portion of a cavity and oriented at an angle selected to provide a desired sensitivity for the 3-TPS. In those embodiments, the fabrication of the 3-TPS element includes at least one deep reactive ion etching step. The method further comprises, during the at least one deep reactive ion etching step, fabricating etched dicing streets along at least the perimeter of the 3-TPS. In those embodiments, the etched dicing streets may eliminate a subsequent need for dicing the 3-TPS from a wafer.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

Detailed Description

Figure 1A:
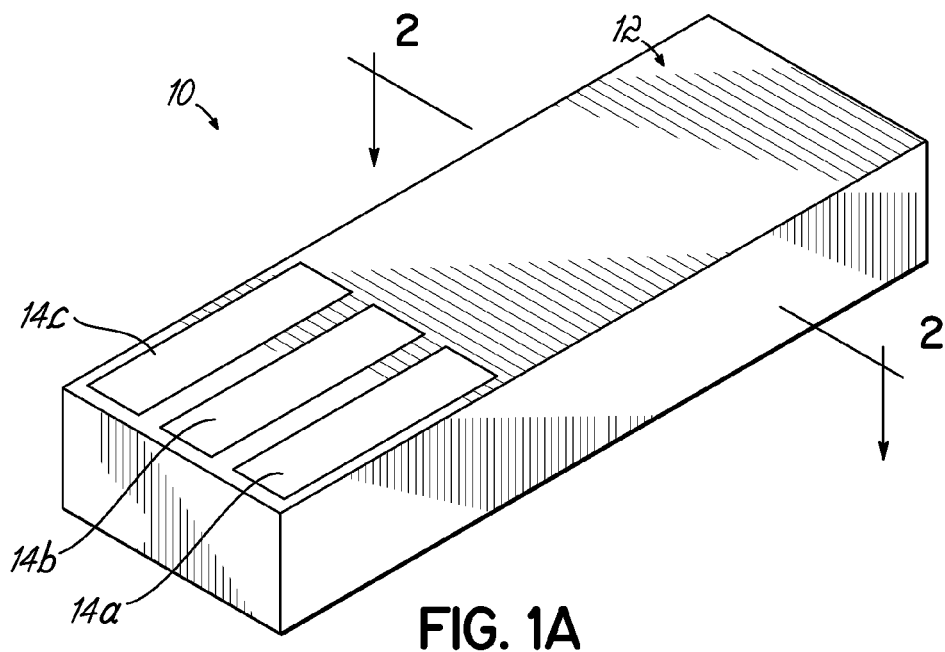
FIG. 1A is a top perspective view of a three-terminal pressure sensor ("3-TPS") consistent with embodiments of the invention.

FIG. 1A illustrates a portion of a single element three terminal piezoresistive pressure sensor 10 (hereinafter, "3-TPS" 10) consistent with embodiments of the invention. In particular, FIG. 1A illustrates the terminal side 12 of the 3-TPS 10 that includes three terminals 14a-c. Specifically, a first terminal 14a may be configured to receive a power signal (e.g., a current and/or voltage signal) for the 3-TPS 10 while the remaining terminals 14b, 14c may be configured to provide respective electrical signals (e.g., current and/or voltage signals) that may be compared to determine the pressure on at least a portion of the 3-TPS 10. In some embodiments, the 3-TPS 10 has a width of about 0.69 French and a length of about three times the width. It will be appreciated by one having ordinary skill in the art that the 3-TPS 10 may have a larger and/or smaller width and/or length.

Figure 1B:
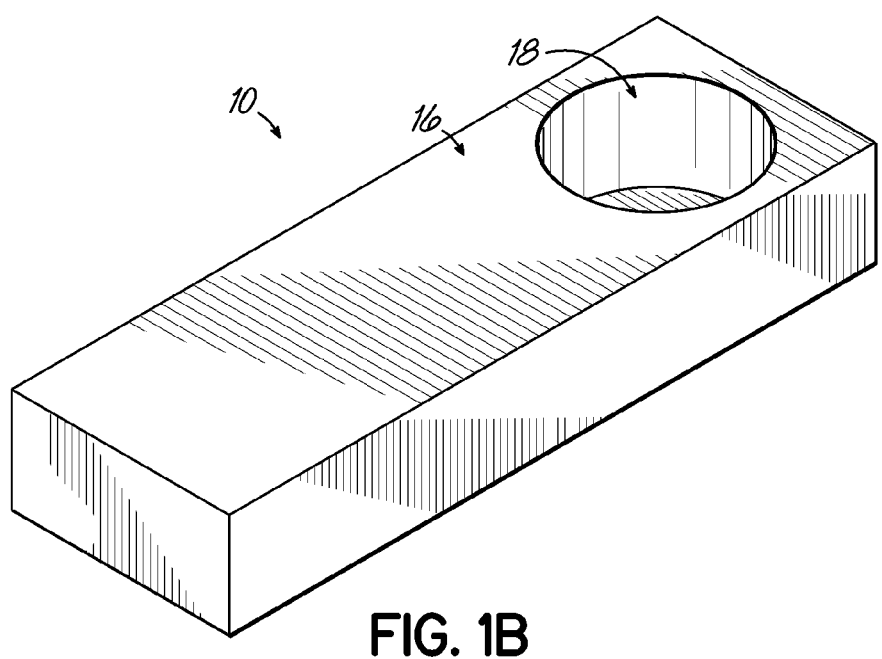
FIG. 1B is a bottom perspective view of the 3-TPS of FIG. 1A.

FIG. 1B illustrates another portion of the 3-TPS 10, and in particular illustrates a diaphragm side 16 of the 3-TPS 10 that includes a diaphragm cavity 18. In some embodiments, and as illustrated in FIG. 1B, the 3-TPS 10 is configured with a substantially round diaphragm cavity 18. In alternative embodiments, it will be appreciated that the 3-TPS 10 may be configured with a substantially rectangular diaphragm cavity, a substantially square diaphragm cavity and/or another type of diaphragm cavity. In some embodiments, the diaphragm cavity 18 has a width and/or diameter of about 180 µm. It will be appreciated by one having ordinary skill in the art that the diaphragm cavity may have a larger and/or smaller width and/or diameter.

Figure 2:
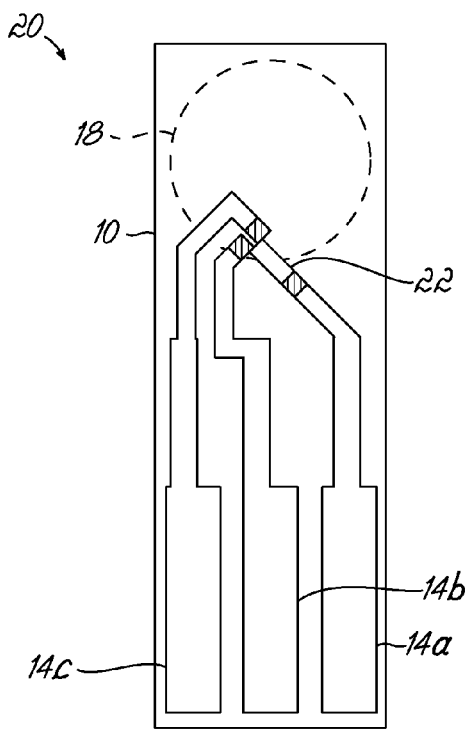
FIG. 2 is a partially transparent top plan view of the 3-TPS of FIGS. 1A-1B.

FIG. 2 is a partially transparent illustration 20 from a top view of the terminal side 12 of the 3-TPS 10 of FIGS. 1A-1B illustrating the internal components of the 3-TPS 10. In particular, FIG. 2 illustrates the electrical connection of the terminals 14a-c to a 3-TPS element 22. The 3-TPS element 22, in some embodiments, is configured at approximately an about 135° angle to a tangent of the diaphragm cavity 18. In some embodiments, at least a portion of the 3-TPS element 22 is placed along an edge of the diaphragm cavity 18. Advantageously, it is believed that the edge of the diaphragm cavity 18 is where the stress magnitude is the greatest. Moreover, it is further believed that placing the 3-TPS element 22 at the about 135° angle at the edge of the diaphragm cavity 18 allows for the detection of both shear stress and gradient stress across that 3-TPS element 22.

Figure 3:
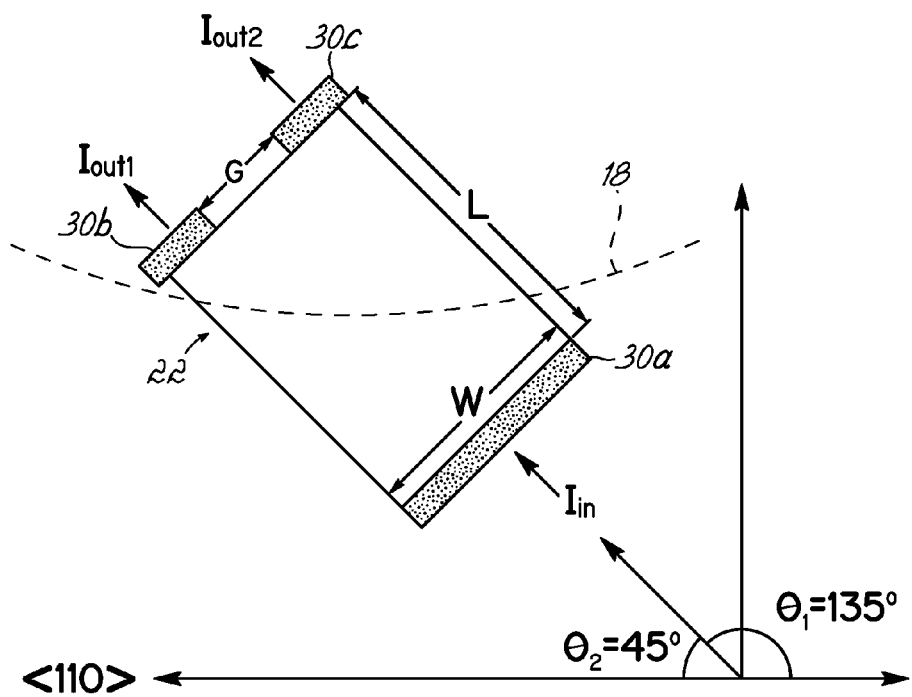
FIG. 3 is a diagrammatic illustration showing a closeup of a 3-TPS element of FIG. 2 that further illustrates an orientation of the 3-TPS element relative to a diaphragm cavity of the 3-TPS.

FIG. 3 is a diagrammatic illustration of at least a portion 3-TPS element 22 and the orientation thereof consistent with embodiments of the invention. In particular, the 3-TPS element 22 may include three terminals 30a-c that may be in turn electrically connected to respective terminals 14a-c of the 3-TPS 10 of FIGS. 1A-1B. The 3-TPS element 22, in some embodiments, may be oriented at the about 135° angle (e.g., $\theta_1$) at the edge of the diaphragm cavity 18. This may also be referred to, in relation to $\theta_2$, as an about 45° angle, e.g., at about a 45° angle to the <110> direction on a (100) n-type wafer. In some embodiments, the 3-TPS element 22 has a length ("L") of about 40 µm and a width ("W") of about half that, or about 20 µm. Additionally, there is a gap ("G") between the terminals 30b and 30c. In some embodiments, the 3-TPS element 22 may have a gap G of about 3 µm.

In some embodiments, the pressure experienced by the 3-TPS element 22 may be determined by comparing the difference of output currents from the terminals 30b and 30c (e.g., $I_{out1}$ and $I_{out2}$, respectively) with reference to in input current to the terminal 30a (e.g., $I_{in}$). For example, for current $I_{in}$ and zero pressure, output currents from the two output terminals should be substantially the same (e.g., $I_{out1}=I_{out2}=I_{in}/2$). However, when the 3-TPS element 22 experiences pressure the input current may redistribute between the two terminals 30b, c. Put alternatively, when the 3-TPS element 22 experiences pressure the output currents (e.g., $I_{out1}$ and $I_{out2}$) may vary from each other. As such, the output currents may differ by a stress-induced change in the current at the terminals 30b, c (e.g., $I_{out1}=I_{out2}=I_{in}/2)-/+ I_{sigma}$, where $I_{sigma}$ is the stress-induced change in the current at the terminals 30b, c). The difference between $I_{out1}$ and $I_{out2}$ may be referred to as the delta current ($\Delta I$), where $\Delta I$ is proportional to the pressure experienced by the 3-TPS element 22.

Figure 4A:
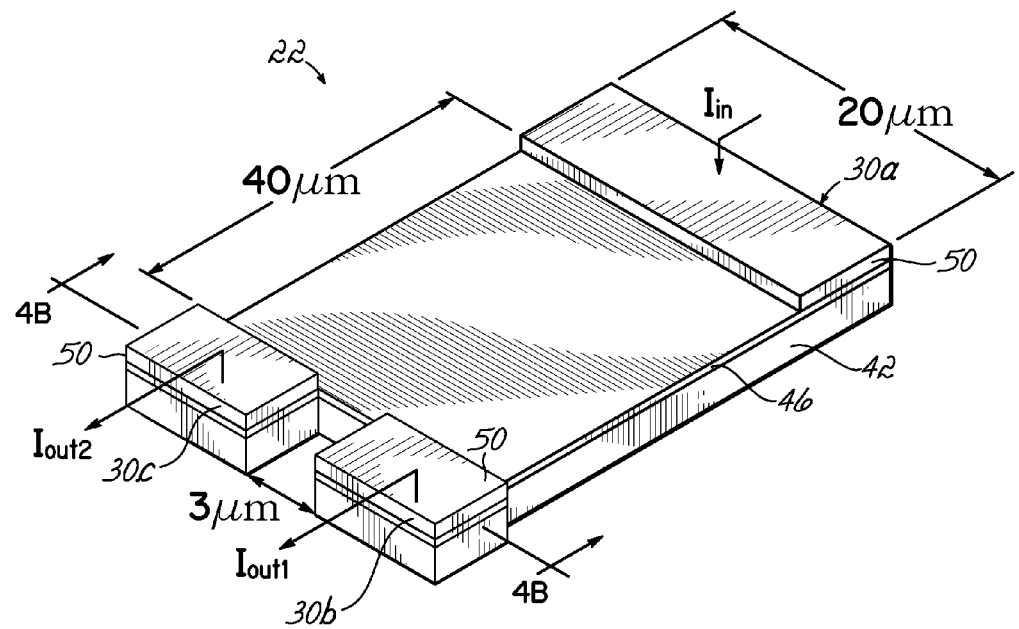
FIG. 4A is a perspective view of the 3-TPS element of FIG. 2.
Figure 4B:
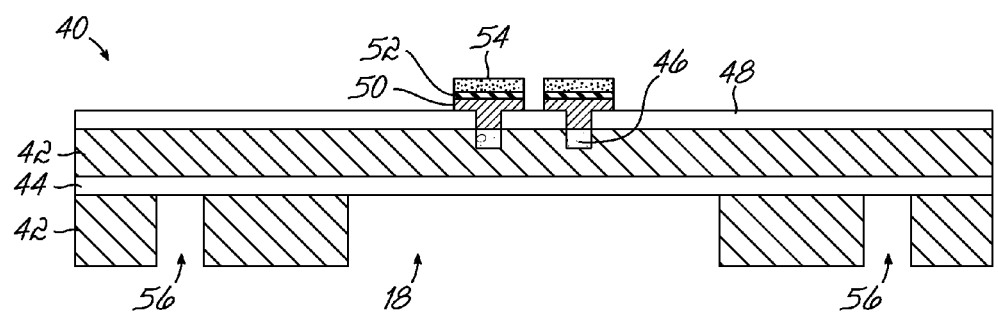
FIG. 4B is a cross-sectional view of at least a portion of the 3-TPS element of FIG. 2, taken along line 4B-4B of FIG. 4A.

In some embodiments, the 3-TPS 10 may include a plurality of layers, including at least one piezoresistive layer. FIG. 4A is a perspective view of at least a portion of a 3-TPS element 22 consistent with embodiments of the invention, while FIG. 4B is a cross-sectional view 40 of at least a portion of the 3-TPS element 22 and the 3-TPS 10 (taken along line 4B-4B of FIG. 4A) consistent with embodiments of the invention. In some embodiments, the fabrication of the 3-TPS 10 begins with a silicon on insulator ("SOI") wafer, e.g., a double-side polished n-type (100) SOI wafer, that includes at least one silicon layer 42 and at least one insulator layer 44. In specific embodiments, the insulator layer 44 may be a thermally grown layer or an ion implanted layer, such as a silicon dioxide layer. Thereafter, a p-type boron implant region or layer 46 may be formed in silicon layer 42 via ion implantation and/or thermal diffusion to form piezoresistive gauges, followed by the deposition of a second insulator layer 48 of silicon dioxide on silicon layer 42. Subsequently, at least a portion of the second insulator layer 48 may be removed to expose contact regions within the boron implant layer and a combination of aluminum 50, titanium 52 and/or platinum layers 54 may be deposited, e.g., by sputtering or e-beam evaporation, among other deposition techniques. At that point, at least a portion of the exposed silicon layer 42 on the opposing side of the wafer may be removed via wafer thinning and deep reactive ion etching to form (or expose) the diaphragm cavity 18 as well as die separation streets 56. In specific embodiments, the die separation streets 56 eliminate the need for subsequent dicing of a wafer upon which the 3-TPS 10 is configured. The diaphragm associated with the diaphragm cavity 18 may include at least a portion of the insulator layer 44, which may be configured to be about 2.5 µm thick. The die separation streets 56, which are optional, may be used to eliminate the need for a final dicing step, thus resulting in a higher yield.

In some embodiments, it is desirable to "tune" the sensitivity of the 3-TPS element 22, and thus tune the sensitivity of the 3-TPS 10. Particular, the sensitivity of the 3-TPS element 22 ($S_{3TPS}$) may be defined in relation to the pressure (P) experienced by the 3-TPS element 22, $\Delta I$ and $I_{in}$. In some embodiments, it may be desirable to have a sensitive 3-TPS 10 where clarity and accuracy is paramount. In alternate embodiments, it may be desirable to have a less sensitive 3-TPS 10 where there is less a requirement for clarity and accuracy. More specifically, the sensitivity of a 3-TPS element 22 and/or 3-TPS 10 may be defined as $S_{3TPS}=\Delta I/(I_{in}*P)$. The sensitivity of the 3-TPS element 22 and/or 3-TPS 10 may be defined in units of uA/A/mmHg. $\Delta I$ can also be defined such that $\Delta I=(L/W)(\sigma\pi_{44})$, which is similar to the current imbalance equation of a split electrode device. However, in the preceding equation, mobility and magnetic flux density of the split electrode device are replaced by conductivity ($\sigma$) and piezoresistance coefficient ($\pi_{44}$).

Throughout embodiments of the invention, Finite Element Analysis (FEA) may be used to optimize the dimensions of the 3-TPS element 22 and its angle of orientation upon a diaphragm prior to fabrication. Specifically, CONVENTORWARE®, an FEA tool distributed by Conventor, Inc., of Cary, N.C., that utilizes MemMech and MemPZR analyzers, may be utilized to simulate different variables of the 3-TPS element 22, and thus provide guidance as to potential future characteristics.

Figure 5:
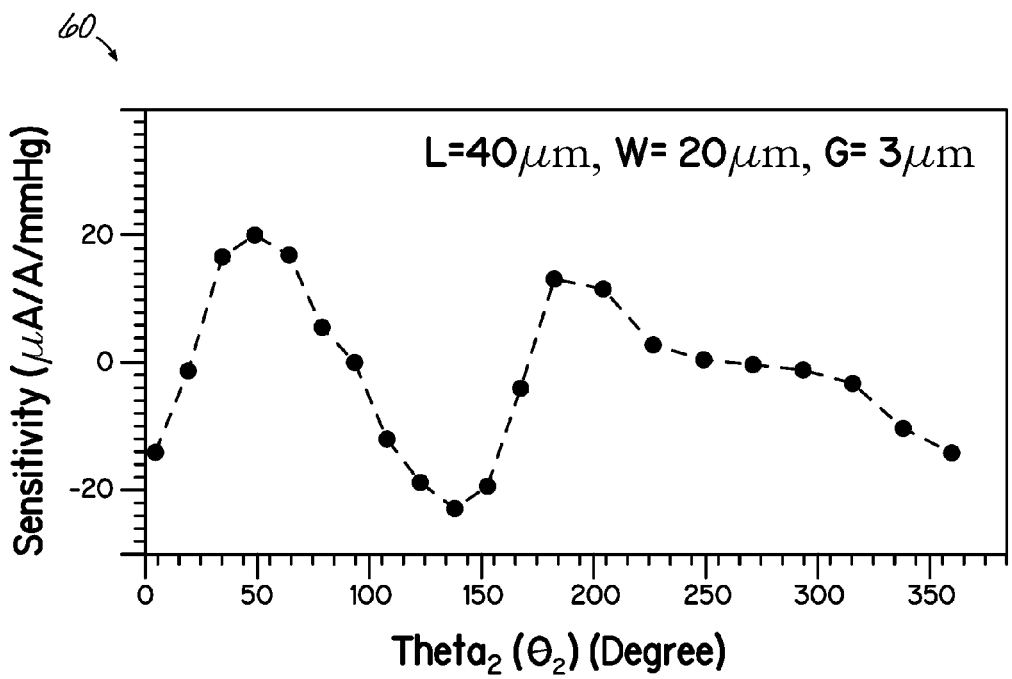
FIG. 5 is a graphical illustration of the expected sensitivity of a 3-TPS element of FIG. 2 along the diaphragm relative to the 3-TPS element's orientation to the diaphragm cavity.

In some embodiments, the sensitivity of the 3-TPS element 22 may be adjusted based on the orientation of the 3-TPS element 22 in relation to a tangent to the perimeter (or edge) of a diaphragm cavity 18. For example, FIG. 5 illustrates a graphical representation 60 of an expected sensitivity based on various angles of the 3-TPS element 22 in relation to edge of the diaphragm cavity 18 (e.g., as illustrated, $\theta_2$), assuming a p-type boron implantation layer in a (100) n-type wafer, and where the angles are relative to the <110> direction of the (100) n-type wafer. Specifically, the graphical representation 60 of the expected sensitivity based on various angles of the 3-TPS element 22 in relation to edge of the diaphragm cavity 18 is determined with a 3-TPS element 22 having a L of about 40 µm, a W of about 20 µm and a G of about 3 µm, as well as a virtual input current of about 2 mA. As illustrated, the greatest positive sensitivity of the 3-TPS element 22 is at about 45°, while the greatest negative sensitivity (i.e., the largest negative sensitivity) is at about 135°. In addition, it may be desirable in some embodiments to orient an element at an angle (e.g., about 25° as shown in FIG. 5, among others) that provides a sensitivity close to 0 uA/A/mmHg, e.g., when it desirable to incorporate a non-responding dummy element in a design.

Figure 6:
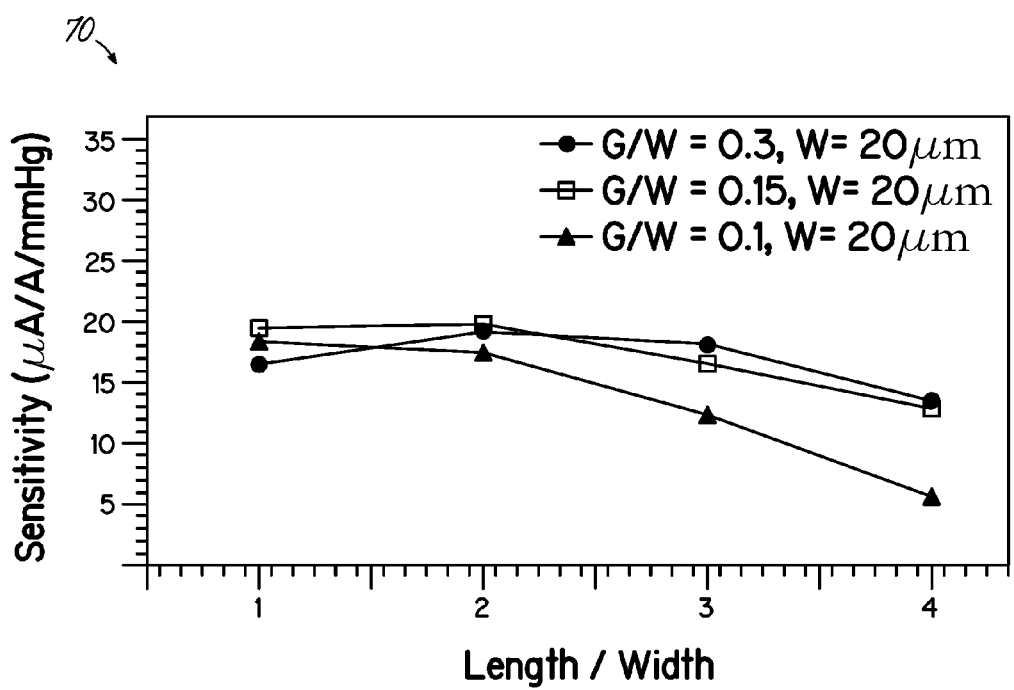
FIG. 6 is a graphical illustration of the expected sensitivity of a 3-TPS element of FIG. 2 relative to proportions of the length and width thereof.

Moreover, the sensitivity of the 3-TPS element 22 may be adjusted based upon adjusting the length (L) thereof in relation to the width (W) thereof. For example, FIG. 6 illustrates a graphical representation 70 of an expected sensitivity of a 3-TPS element 22 based on varying the proportion of the length (L) of the 3-TPS element 22 to the width (W) of the 3-TPS element 22. Specifically, the gap (G) was of the 3-TPS element 22 was configured as about 3 µm, while the angle of the 3-TPS element 22 in relation to the edge of the diaphragm cavity 18 was about 45°. More specifically, the width of the 3-TPS element 22 was configured as about 10 µm, about 20 µm and about 30 µm, while the length was varied to about 1×, about 2×, about 3× and about 4× thereof while a virtual input current of about 2 mA was applied. As illustrated in FIG. 6, the greatest sensitivity is where the length of the 3-TPS element 22 is about 40 µm and the width of the 3-TPS element 22 is about 20 µm, while the smallest sensitivity is where the length of the 3-TPS element 22 is about 120 µm and the width of the 3-TPS element 22 is about 30 µm.

Figure 7:
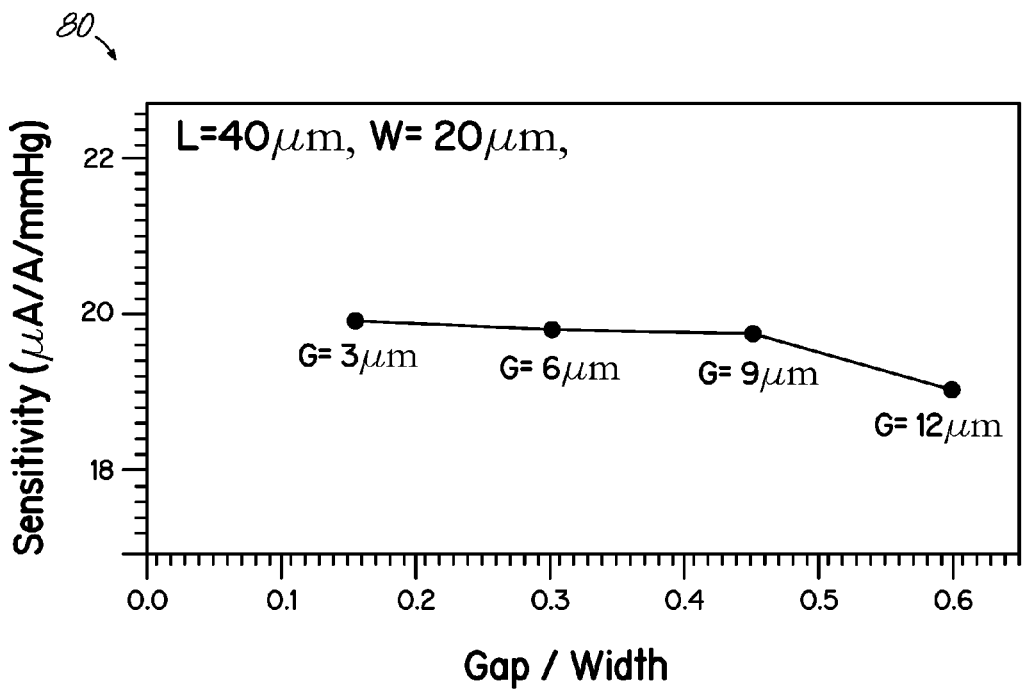
FIG. 7 is a graphical illustration of the expected sensitivity of a 3-TPS element of FIG. 2 relative to proportions of the gap and the width thereof.

Sill further, the sensitivity of the 3-TPS element 22 may be adjusted based upon adjusting the gap (G) in relation to the width (W). For example, FIG. 7 is a graphical illustration 80 of an expected sensitivity of a 3-TPS element 22 based on varying the proportion of the gap (G) of the 3-TPS element 22 to the width (W) of the 3-TPS element 22. Specifically, the length (L) and width (W) of the 3-TPS element 22 were configured as about 40 µm and 20 µm, respectively, while the angle of the 3-TPS element 22 in relation to the edge of the diaphragm cavity 18 was about 45°. More specifically, the gap of the 3-TPS element 22 was configured as about 3 µm, about 6 µm, about 9 µm and about 12 µm while a virtual input current of about 2 mA was applied. As illustrated in FIG. 7, the greatest sensitivity is where the gap of the 3-TPS element 22 is about 3 µm, while the smallest sensitivity is where the gap of the 4-TPS element 22 is about 12 µm.

The expected results were compared to actual results with a plurality of 3-TPS elements 22. Specifically, the sensitivity of a plurality of 3-TPS elements 22 configured at various angles (e.g., about 0°, about 15°, about 22.5°, about 30°, about 45° and about 90°) in relation to edge of the diaphragm cavity 18 were determined. TABLE 1 indicates those determined sensitivities. Specifically, TABLE 1 indicates the sensitivities of a plurality of 3-TPS elements 22 at the various angles, each 3-TPS element having a length of about 40 µm, a width of about 20 µm and a gap of about 3 µm, as well as an input current of about 2 mA.

TABLE 1

Expected and Actual Sensitivity of a Plurality
of 3-TPS Elements with Varying $\theta_2$
Sensitivity from 0 to 300 mmHg (µA/A/mmHg)

| Angle $\theta_2$ (Degrees) | 0 | 15 | 22.5 | 30 | 45 | 90 |
|---|---|---|---|---|---|---|
| Expected Sensitivity (µA/A/mmHg) | 0.75 | 27.4 | 37 | 45 | 51 | 0 |
| Avg. Actual Sensitivity (µA/A/mmHg) | 2 | 38 | 51 | 61 | 73 | 3 |
| Standard Deviation of Avg. Actual Sensitivity | 0.23 | 0 | 3.21 | 1.52 | 7.37 | 1.15 |

Thus, TABLE 1 indicates that the greatest sensitivity was obtained at a $\theta_2$ of about 45°, while the lowest sensitivity (i.e., closest to zero) was obtained at a $\theta_2$ of about 0° and 90°, which is consistent with the expected results.

Moreover, the expected sensitivities that were based on the proportion of length to width were also compared to actual results with a plurality of 3-TPS elements 22. Specifically, the sensitivity of a plurality of 3-TPS elements 22 with various proportions of length to width were determined. TABLES 2 and 3 indicate those determined sensitivities. Specifically, TABLE 2 indicates the sensitivities of a plurality of 3-TPS elements 22 configured at a $\theta_2$ of about 45° in relation to edge of a diaphragm cavity 18, a width of about 10 µm, and a gap of about 3 µm, as well as an input current of about 2 mA. TABLE 3, however, indicates the sensitivities of a plurality of 3-TPS elements 22 configured at a $\theta_2$ of about 45° in relation to an edge of a diaphragm cavity 18, a width of about 20 µm, and a gap of about 3 µm, as well as an input current of about 2 mA.

TABLE 2

Expected and Actual Sensitivity of a Plurality of 3-TPS Elements
with Varying Proportions of Length to Width, with Width of 10 µm
Sensitivity from 0 to 300 mmHg (µA/A/mmHg)

| Length (µm) | 10 | 20 | 30 | 40 |
|---|---|---|---|---|
| Expected Sensitivity (µA/A/mmHg) | 17 | 19 | 18 | 14 |
| Actual Sensitivity (µA/A/mmHg) | 27 | 28 | 26.66 | 25.66 |
| Standard Deviation of Actual Sensitivity | 0.6 | 2 | 1.15 | 1.15 |

TABLE 3

Expected and Actual Sensitivity of a Plurality of 3-TPS Elements
with Varying Proportions of Length to Width, with Width of 20 µm
Sensitivity from 0 to 300 mmHg (µA/A/mmHg)

| Length (µm) | 20 | 40 | 60 | 80 |
|---|---|---|---|---|
| Expected Sensitivity (µA/A/mmHg) | 19 | 20 | 17 | 13 |
| Actual Sensitivity (µA/A/mmHg) | 21 | 28 | 22.66 | 20.4 |
| Standard Deviation of Actual Sensitivity | 1.23 | 2 | 2 | 1.5 |

Thus, TABLES 2 and 3 indicate that the greatest sensitivity was obtained at a length to width ratio of about 2:1, which is consistent with the expected results.

Figure 8:
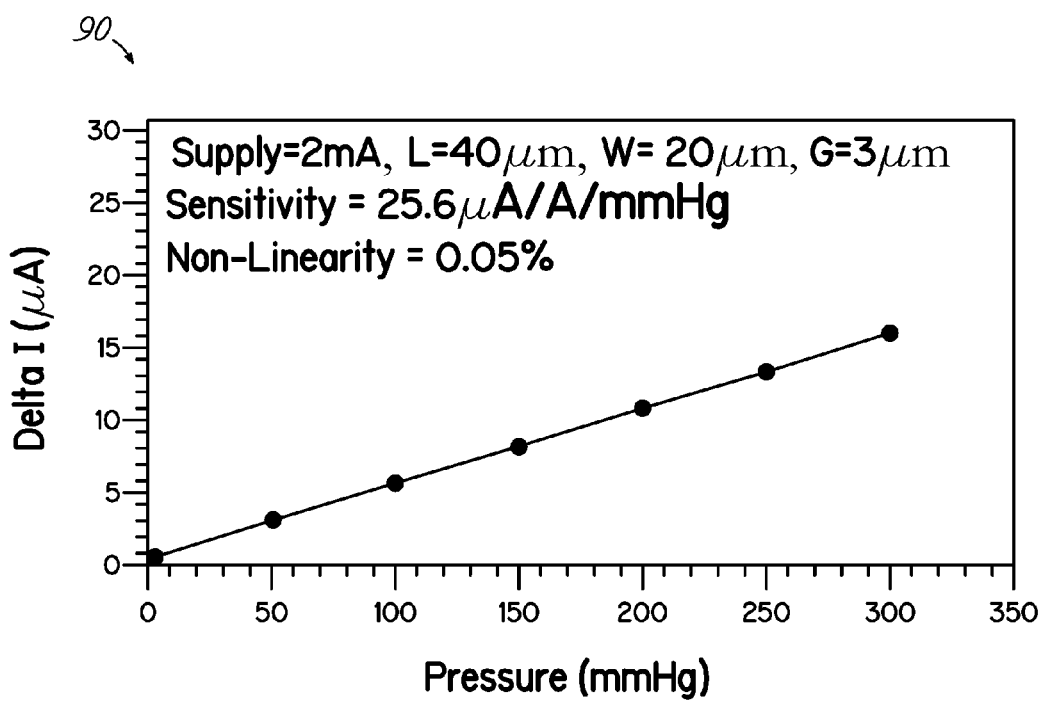
FIG. 8 is a graphical illustration of the direct correlation between the difference of current from the 3-TPS of FIGS. 1A-1B relative to pressure experienced by that 3-TPS.

After determining a length, width, gap and/or angle in relation to an edge of a diaphragm cavity 18, the 3-TPS element 22 and/or the 3-TPS 10 may be fabricated accordingly. FIG. 8 is a graphical illustration 90 of the difference between the output currents (e.g., the difference between $I_{out1}$ and $I_{out2}$) of at least one 3-TPS 10 at various pressures. In particular, FIG. 8 illustrates the difference between the output currents of the at least one 3-TPS element 22 and/or the 3-TPS 10 at various pressures, the 3-TPS element 22 thereof having a length of about 40 µm, a width of about 20 µm, a gap of about 3 µm, and a $\theta_2$ of about 45° in relation to an edge of a diaphragm cavity 18, as well as an input current of about 2 mA. As illustrated, the difference between the output currents of the at least one 3-TPS element 22 and/or the 3-TPS 10 are substantially directly proportional to the pressure experienced by the 3-TPS element 22 and/or the 3-TPS 10. Additionally, FIG. 8 illustrates that the 3-TPS element 22 has a highly consistent response with respect to pressure, illustrating a non-linearity of about 0.05% and a sensitivity of about 25.6 µA/A/mmHg. As illustrated, the 3-TPS element 22 may be associated with a zero pressure offset ranging between 40 to 110 µA.

Figure 9:
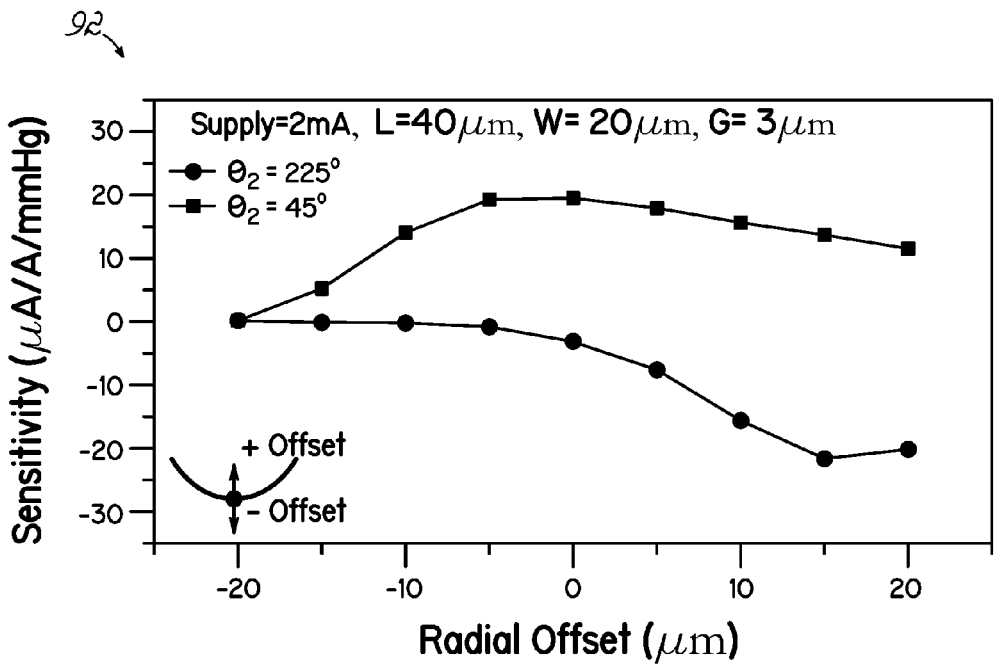
FIG. 9 is a graphical illustration of the correlation of radial offset relative to the sensitivity of the 3-TPS element of FIG. 2 along a diaphragm cavity of the 3-TPS.

Moreover, the position of the 3-TPS element 22 upon the diaphragm cavity 18 may also be adjusted with to the radial offset of the 3-TPS element 22 on the edge of the diaphragm cavity 18. Specifically, and as illustrated in FIG. 2 and FIG. 3, the center of the 3-TPS element 22 may be configured upon the outer diameter of the diaphragm cavity 18. FIG. 9 is a graphical illustration 92 of the predicted FEA sensitivity of the 3-TPS element 22 across a plurality of positive and negative radial offsets. In particular, FIG. 9 illustrates that the 3-TPS element 22 is at about its greatest positive sensitivity (e.g., about 20 µA/A/mmHg) at a radial offset of about zero and a $\theta_2$ of about 45°. This compares favorably with the actual sensitivity of the 3-TPS element 22 discussed above. Similarly, FIG. 9 illustrates that the 3-TPS element 22 is at about its greatest negative sensitivity (e.g., about −20 µA/A/mmHg) at a radial offset of about −20 µm and a $\theta_2$ of about 225°.

Figure 10:
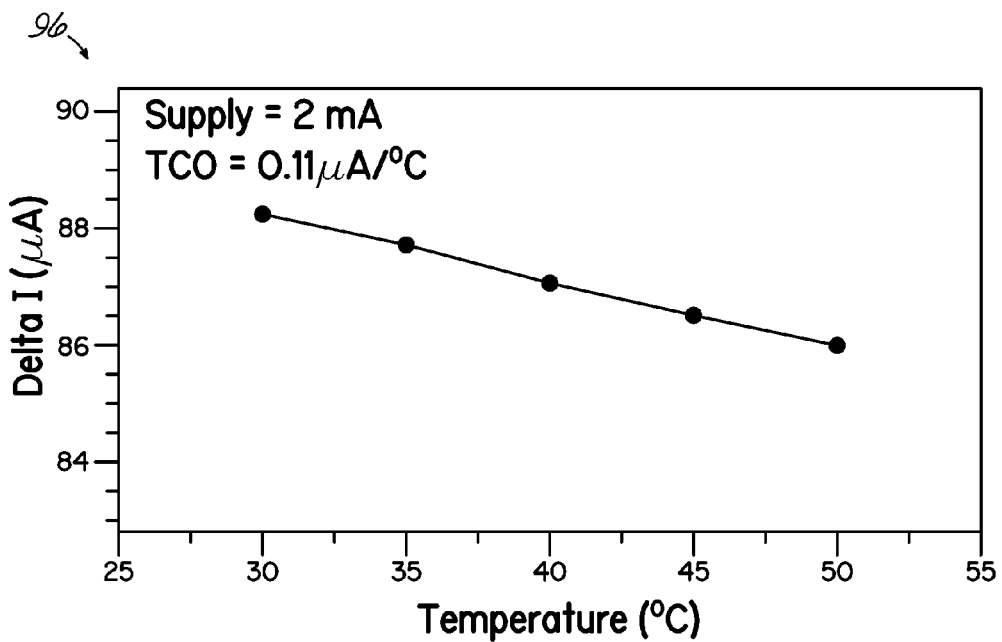
FIG. 10 is a graphical illustration of the correlation of the difference in current relative to the temperature experienced by the 3-TPS of FIGS. 1A-1B.

In some embodiments, test measurements of the 3-TPS element 22 indicate that a typical 3-TPS element 22 has a Temperature Coefficient of Offset (TCO) of about 0.11 µA/° C., with the TCO being generally a measure of non-pressure induced stresses as a function of temperature. Specifically, FIG. 10 is a graphical illustration 96 indicating the average actual temperature responses of a plurality of 3-TPS elements 22, and in particular indicates that the TCO for the 3-TPS element is about 0.11 µA/° C.

Figure 11:
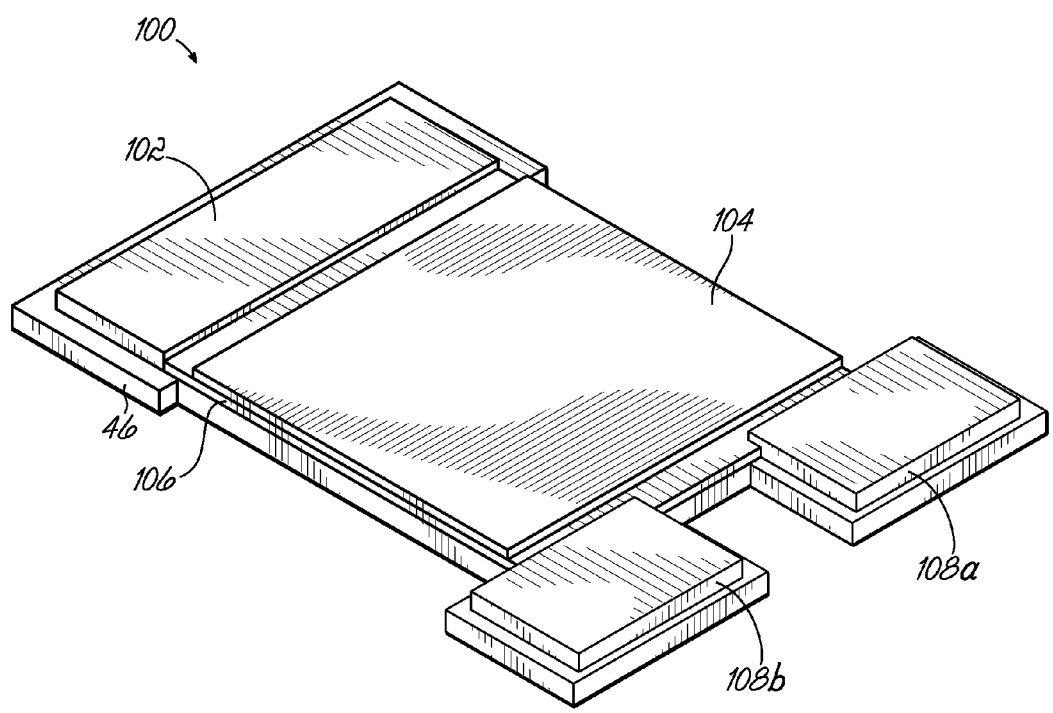
FIG. 11 is a diagrammatic illustration of a 3-TPS configured with at least one source, gate and drain consistent with alternative embodiments of the invention.

FIG. 11 is a perspective view of a gated 3-TPS element 100 consistent with alternative embodiments of the invention, which, in addition to incorporating a 3-TPS element, is additionally configured as a dual drain Field Effect Transistor (FET), thereby providing a pressure sensitive 3-terminal FET. Specifically, the gated 3-TPS element 100, in some embodiments, is configured as a 3-TPS element such as 3-TPS element 22 of FIGS. 3-4B, and further includes an insulating layer 106, e.g., an oxide layer, deposited over layer 46 of 3-TPS element 22 and a metal contact 104 deposited over insulating layer 106 and serving as a gate terminal. Gated 3-TPS element 100 further uses a terminal 102 corresponding to terminal 30a of 3-TPS element 22 as a source, and uses terminals 108a and 108b corresponding to terminals 30b and 30c of 3-TPS element 22 as respective drains. As illustrated, the insulating layer 106 and metal contact 104 are configured upon the length and width of the boron implant layer 46, with the layer 46 serving as a channel for the FET. By varying voltage at the metal contact 104 (e.g., across the insulating layer 106, and/or through a combination of source terminal 102 and drain terminals 108a and/or 108b) the concentration, mobility and piezoresistive properties of carriers in the boron implant layer 46 may be affected. As such, varying the voltage applied at the metal contact 106 varies the sensitivity through the gated 3-TPS element 100 as the affected concentration and mobility of carriers in the boron implant layer 46 affects the piezoresistive coefficient thereof.

Thus, embodiments of the invention provide for a 3-terminal pressure sensor that may be fabricated to a size that is about 1-French or smaller. In particular, embodiments of the invention may be utilized where the maximum sensitivity required is less than 15 μV/V/mmHg. Specifically, in some embodiments the 3-TPS may be considered to be analogous to a split electrode magnetic field device (e.g., a "Hall" device, or "Hall-Effect" device) with pressure replacing the magnetic field to redistribute current. Moreover, embodiments of the invention may exhibit greater sensitivity than conventional pressure sensors, including conventional Half-Wheatstone Bridge configurations, due to their decreased size as well as the effect of both shear stress across a diaphragm of a diaphragm cavity and gradient stress on the diaphragm of the diaphragm cavity. Embodiments of the invention may also suffer less drift of measurements over time due to the solid-state nature of the 3-TPS small number of layers, components and/or interconnections. Additionally, it is believed that by using a 3-TPS that includes a single element (e.g., the 3-TPS element) consistent with embodiments of the invention, the linearity error percentage is also decreased. Furthermore, it is believed that embodiments consistent with the invention decrease temperature effects on pressure sensing as well as allow a zero pressure current differential to approach zero. In addition, embodiments consistent with the invention, by virtue of incorporating a single 3-TPS element, are easier to align with a diaphragm edge than multi-element Wheatstone Bridge configurations requiring the alignment of multiple elements, thereby providing a more tolerant manufacturing process.

While the present invention has been illustrated by a description of the various embodiments and the examples, and while these embodiments have been described in considerable detail, it is not the intention of the applicants to restrict or in any way limit the scope of the appended claims to such detail. Thus, although embodiments of the invention are illustrated through FIGS. 1-11, one having ordinary skill in the art will appreciate that additional advantages and modifications may be made without departing from the scope of the present disclosure. For example, although some measurements have been recited, it will be appreciated by one skilled in the art that the measurements may be larger or smaller consistent with alternative embodiments of the invention. Specifically, although a 3-TPS element with a length of 40 μm, a width of 20 μm, a gap of 3 μm and/or an orientation of 135° relative to a tangent of a diaphragm cavity has been principally described, one having ordinary skill in the art will appreciate that various other lengths, widths, gaps and/or thetas (e.g., $\theta_1$ and/or $\theta_2$) may be used without departing from the scope of the invention. Moreover, although a 3-TPS is described as having a piezoresistive material of a p-type boron implant layer, one having ordinary skill in the art will appreciate that different types of piezoresistive materials may be used without departing from the scope of the present disclosure. Indeed, one having ordinary skill in the art will appreciate that piezoelectric materials may be used in the 3-TPS, and in particular in the 3-TPS element, without departing from the scope of the present disclosure. Similarly, although a plurality of metals, layers, connections and fabrication processes are illustrated, one having ordinary skill in the art will appreciate that more or fewer metals, layers and/or connections, as well as different metals, layers, connections, and/or fabrication processes may be used without departing from the scope of the present disclosure. Thus, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A three terminal pressure sensor ("3-TPS"), comprising: a first semiconducting layer having a substantially circular cavity; an insulating layer configured on the semiconducting layer, at least a portion of the insulating layer overlapping the cavity; a second semiconducting layer configured on the insulating layer; and a 3-TPS element, at least a portion of which is configured on the second semiconducting layer, the 3-TPS element comprising: at least one piezoresistive layer having a length of at least about 40 μm and a width of at least about 20 μm; an input terminal; and first and second output terminals, wherein the 3-TPS element includes at most three terminals and overlaps at least a portion of the perimeter of the cavity, wherein the 3-TPS element is oriented at an angle of about 45 degrees from a tangent line to the perimeter of the cavity, and wherein at least a portion of the first or second output terminals overlaps the cavity and at least a portion of the input terminal does not overlap the cavity.

2. A method of manufacturing a three terminal pressure sensor ("3-TPS"), comprising: fabricating a 3-TPS element that overlaps at least a portion of a cavity, the 3-TPS element having an angle at which the 3-TPS element is configured across the at least a portion of the cavity; and fabricating an input terminal and first and second output terminals in communication with the 3-TPS element.; wherein the 3-TPS element includes at most three terminals.

3. The method of claim 2, wherein the 3-TPS element has a length of at least about 40 μm.

4. The method of claim 2, wherein the 3-TPS element has a width of at least about 20 μm.

5. The method of claim 2, wherein the angle is about 45 degrees from a tangent line to the perimeter of the cavity.

6. The method of claim 2, wherein the angle is about 45 degrees from a <110> direction of a silicon-on-insulator wafer upon which the 3-TPS element is fabricated.

7. The method of claim 2, further comprising:
fabricating a diaphragm layer between the 3-TPS element and a second layer that includes the cavity.

8. The method of claim 2 wherein the first and second output terminals are separated by a gap of about 3 μm.

9. The method of claim 2, wherein the cavity is substantially circular.

10. A three terminal pressure sensor ("3-TPS"), comprising: a semiconducting layer having a cavity; and a 3-TPS element having at most three terminals and at least one piezoresistive layer overlapping at least a portion of the cavity and oriented at an angle selected to provide a desired sensitivity for the 3-TPS.

11. The three terminal pressure sensor of claim 10, further comprising:
an insulating layer configured between the semiconducting layer and the 3-TPS element.

12. The three terminal pressure sensor of claim 10, further comprising:
a second semiconducting layer upon which the 3-TPS element is configured.

13. The three terminal pressure sensor of claim 10, wherein the at least one piezoresistive layer includes at least one p-type boron implant region.

14. The three terminal pressure sensor of claim 10, wherein the at least one piezoresistive layer is oriented at an about 45 degree angle relative to a <110> direction of a (100) n-type SOI wafer upon which the 3-TPS element is fabricated.

15. The three terminal pressure sensor of claim 10, wherein the at least one piezoresistive layer is oriented at an about 45 degree angle from a tangent line to a perimeter of the cavity.

16. The three terminal pressure sensor of claim 10, wherein the 3-TPS element has a length of at least about 40 µm.

17. The three terminal pressure sensor of claim 10, wherein the 3-TPS element has a width of at least about 20 µm.

18. The three terminal pressure sensor of claim 10, wherein the cavity is a substantially circular cavity.

19. The three terminal pressure sensor of claim 10, further comprising at least one contact disposed proximate the at least one piezoresistive layer and separated therefrom by a second insulator layer, the contact configured to apply a selected voltage across the at least one piezoresistive layer to control the sensitivity of the 3-TPS.

20. The three terminal pressure sensor of claim 19, further comprising a dual drain field effect transistor comprised of the at least one piezoresistive layer, the contact, the second insulator layer and the first, second, and third electrical terminals.

21. The three terminal pressure sensor of claim 10, wherein a first portion of the at least one piezoresistive layer communicates with an input terminal, wherein a second portion of the at least one piezoresistive layer communicates with a first output terminal, and wherein a third portion of the at least one piezoresistive layer communicates with a second output terminal.

22. A method, comprising: fabricating a three terminal pressure sensors ("3-TPS") of the type that includes a 3-TPS element having at most three terminals and at least one piezoresistive layer overlapping at least a portion of a cavity and oriented at an angle selected to provide a desired sensitivity for the 3-TPS, wherein fabricating the 3-TPS element includes at least one deep reactive ion etching step; and fabricating etched dicing streets along at least the perimeter of the 3-TPS during the at least one deep reactive ion etching step.

23. The method of claim 22, wherein the etched dicing streets eliminate a subsequent need for dicing the 3-TPS from a wafer and wherein the fabrication of the etched dicing streets is performed concurrently with the formation of the cavity.

* * * * *